(12) United States Patent
Michalak et al.

(10) Patent No.: US 8,864,239 B2
(45) Date of Patent: Oct. 21, 2014

(54) VEHICLE SEAT BACK REST STRUCTURE

(75) Inventors: Eric B. Michalak, Northville, MI (US);
Gregg R. Laframboise, Windsor (CA);
Daniel J. Sakkinen, Highland, MI (US);
Ornela Zekavica, Novi, MI (US);
Antoine Kmeid, Canton, MI (US);
Joseph F. Prosniewski, Brownstown Township, MI (US); Alexander I. Balin, Ann Arbor, MI (US); Nicholas L. Petouhoff, South Lyon, MI (US)

(73) Assignee: Johnson Controls Technology Company, Holland, MI (US)

( * ) Notice: Subject to any disclaimer, the term of this patent is extended or adjusted under 35 U.S.C. 154(b) by 226 days.

(21) Appl. No.: 13/382,631

(22) PCT Filed: Jul. 9, 2010

(86) PCT No.: PCT/US2010/041455
§ 371 (c)(1),
(2), (4) Date: Apr. 4, 2012

(87) PCT Pub. No.: WO2011/006025
PCT Pub. Date: Jan. 13, 2011

(65) Prior Publication Data
US 2012/0181839 A1    Jul. 19, 2012

Related U.S. Application Data

(60) Provisional application No. 61/224,559, filed on Jul. 10, 2009.

(51) Int. Cl.
*A47C 9/00* (2006.01)
*B60N 2/68* (2006.01)

(52) U.S. Cl.
CPC ...................................... *B60N 2/686* (2013.01)

USPC ................................. 297/452.55; 297/452.18

(58) Field of Classification Search
USPC ............. 297/452.12, 452.18, 452.37, 452.14, 297/452.56, 451.63, 216.3, 45.63, 216.32
See application file for complete search history.

(56) References Cited

U.S. PATENT DOCUMENTS 3,647,260 A * 3/1972 Grant et al. .................... 297/229
3,861,747 A * 1/1975 Diamond .................. 297/452.49

(Continued)

FOREIGN PATENT DOCUMENTS

DE     198 27 563 A1    12/1999
DE     19827563         12/1999

(Continued)

OTHER PUBLICATIONS

IPER and Written Report of related PCT Application No. US2010/041455 filed Jul. 9, 2010, Published as WO2011/006025 A2 on Jan. 13, 2011; mailed on Jan. 19, 2012.

(Continued)

*Primary Examiner* — Jose V Chen
(74) *Attorney, Agent, or Firm* — The Dobrusin Law Firm, PC

(57) ABSTRACT

Disclosed is a back rest structure for vehicle seats and a method for manufacturing the same. The back rest structure has a back panel element and a seat back frame element fixed to each other, where at least one of the back panel element or the seat back frame element is provided of a thermoplastic composite material comprising a thermoplastic compound material and a reinforcement material, wherein with respect to the thermoplastic material the reinforcement material represents 50 wt-% or more than 50 wt-%.

13 Claims, 4 Drawing Sheets

(56) References Cited

U.S. PATENT DOCUMENTS

| | | | |
|---|---|---|---|
| 4,577,907 A * | 3/1986 | Talmon et al. | 297/452.12 |
| 5,611,598 A * | 3/1997 | Knoblock | 297/452.14 |
| 5,895,096 A * | 4/1999 | Massara | 297/452.34 |
| 6,260,924 B1 * | 7/2001 | Jones et al. | 297/452.18 |
| 6,386,638 B1 * | 5/2002 | Strauch | 297/452.18 |
| 6,565,152 B2 * | 5/2003 | Craft et al. | 297/248 |
| 6,688,700 B2 * | 2/2004 | Gupta et al. | 297/452.18 |
| 7,111,888 B1 * | 9/2006 | Dehart | 296/68.1 |
| 7,137,670 B2 * | 11/2006 | Gupta et al. | 297/452.65 |
| 7,243,998 B2 | 7/2007 | Fourrey et al. | |
| 7,850,246 B2 * | 12/2010 | Kolich et al. | 297/452.15 |
| 7,954,762 B2 * | 6/2011 | Boren et al. | 297/452.18 |
| 8,282,172 B2 * | 10/2012 | Schmitz et al. | 297/452.15 |
| 8,511,748 B2 * | 8/2013 | McLeod et al. | 297/216.1 |
| 8,540,318 B2 * | 9/2013 | Folkert et al. | 297/452.53 |
| 2002/0050413 A1 * | 5/2002 | Renault | 180/69.1 |
| 2005/0023880 A1 | 2/2005 | Fourrey et al. | |
| 2008/0150342 A1 * | 6/2008 | Kismarton et al. | 297/452.18 |
| 2013/0119743 A1 * | 5/2013 | Evans et al. | 297/452.18 |
| 2013/0257119 A1 * | 10/2013 | Roberts | 297/216.13 |

FOREIGN PATENT DOCUMENTS

| | | |
|---|---|---|
| EP | 1 946 962 A2 | 7/2008 |
| EP | 1946962 | 7/2008 |
| GB | 2 434 530 A | 8/2007 |
| GB | 2434530 | 8/2007 |
| JP | 57-004427 | 11/1982 |
| JP | 58-190224 | 2/1983 |
| JP | 09-226039 | 2/1997 |
| JP | 2005-000194 | 6/2005 |
| WO | 2011/006025 A2 | 1/2011 |

OTHER PUBLICATIONS

International Search Report for related PCT Application No. US2010/041455 filed Jul. 9, 2010, Published as WO2011/006025 A2 on Jan. 13, 2011; mailed on Jul. 15, 2011.

Japanese Office Action dated Jul. 23, 2013 (Application No. 2012-519746).

EP Communication dated Jul. 10, 2013; Appln. No. 10 732 814.8-1753.

A. Osswald et al., International Plastics Handbook the Resource for Plastic Engineers (Sep. 1, 2006).

* cited by examiner

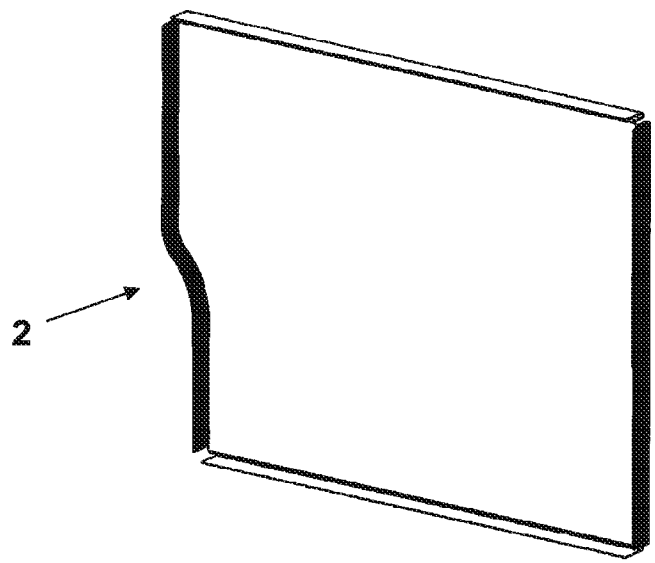
Fig. 3
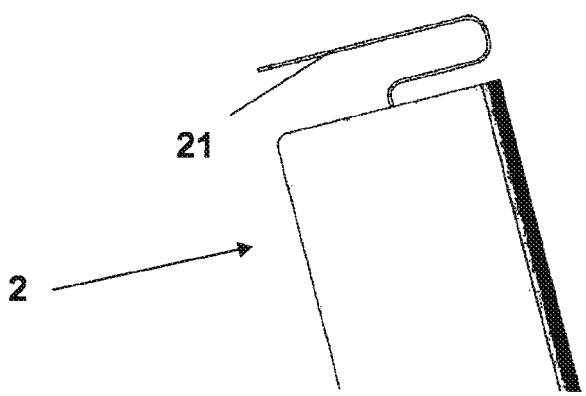 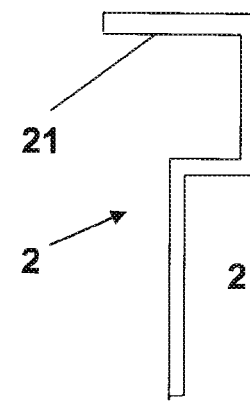 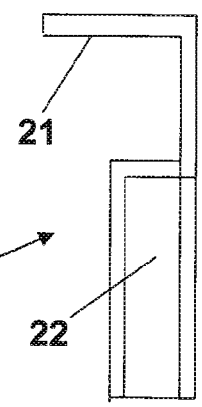
Fig. 4a          Fig. 4b     Fig. 4c

VEHICLE SEAT BACK REST STRUCTURE

CLAIM OF PRIORITY

The present application claims the benefit of the filing date of U.S. Provisional Application Ser. No. 61/224,559 (filed Jul. 10, 2009), and the entirety of the contents of this application being hereby expressly incorporated by reference.

FIELD OF THE INVENTION

This invention generally relates to seating systems for a vehicle and, more particularly, to back rest structures of such vehicle seats.

BACKGROUND

Such back rest structures for vehicle seats are commonly provided with a back panel element and a seat back frame element which are made of metal. From U.S. patent publication U.S. 2006/175887 A1, a rear seat backrest frame for a rear backrest component of a vehicle seat is known, having at least one main plate, a left and right vertically extending lateral hat-shaped section, one upper and one lower transversely extending hat-shaped section, the hat-shaped sections are welded to the front surface of the main plate. Such metal structures have the drawback that their weight is considerable and that the production process involves methods, such as welding, that are costly and tend to conduct to comparably high tolerance ranges of the finished product.

SUMMARY

One object of the present invention is to eliminate or at least reduce the drawbacks related to the prior art and to provide a back rest structure for vehicle seats as well as a method of manufacturing such back rest structures such that at comparable stability and strength properties of the back rest structure a lower weight of the back rest structure, a more cost effective production and lower tolerance ranges are possible to achieve.

The problem is solved by means of a back rest structure for vehicle seats having a back panel element and a seat back frame element, the back panel element and the seat back frame element being fixed to each other, where at least one of the back panel element or of the back frame element being provided of a thermoplastic composite material, the thermoplastic composite material comprising a thermoplastic compound material and a reinforcement material, wherein with respect to the thermoplastic composite material the reinforcement material represents 50 wt-% or more than 50 wt-%. According to preferred embodiments of the present invention, the reinforcement material represents 65 wt-% or more than 65 wt-% of the thermoplastic composite material. According to other preferred embodiments of the present invention, the reinforcement material represents 80 wt-% or more than 80 wt-% of the thermoplastic composite material.

According to other preferred embodiments of the present invention, the thermoplastic composite material is prefabricated, especially in the form of a tape or in the form of a film or in the form of a foil-like structure or sheet.

Thereby, it is advantageously possible to provide the thermoplastic composite material in a comparably inexpensive manner.

It is further preferred according to the present invention that the thermoplastic composite material comprises PET as the thermoplastic compound material.

Furthermore, it is preferred that the thermoplastic composite material is at least partly provided hollow or comprises at least partly a hollow.

Thereby, it is advantageously possible to reduce the weight and to increase the stability (or strength) of the resulting back rest structure.

According to the present invention, it is furthermore preferred that the thermoplastic composite material comprises a foam material or a foam core element.

Thereby, a further increase in stability can be achieved for the resulting back rest structure.

According to a further preferred embodiment according to the present invention, the foam core element has a density equal to or higher of 0.040 g/cm$^3$ and equal to or lower of 0.120 g/cm$^3$, preferably equal to or higher of 0.060 g/cm$^3$ and equal to or lower of 0.100 g/cm$^3$, more preferably equal to or higher of 0.075 g/cm$^3$ and equal to or lower of 0.085 g/cm$^3$ and most preferably in the range of 0.080 g/cm$^3$.

The present invention further relates to a method for manufacturing a back rest structure for vehicle seats, the back rest structure having a back panel element and a seat back frame element, the back panel element and the seat back frame element being fixed to each other, where at least one of the back panel element or of the seat back frame element being provided of a thermoplastic composite material, wherein the method comprises the steps of:
  prefabricating the thermoplastic composite material,
  thermoforming the thermoplastic composite material,
  stamping or cutting the thermoplastic composite material,
wherein the step of stamping or cutting the thermoplastic composite material is performed either prior or later to thermoforming the thermoplastic composite material.

Thereby, it is advantageously possible to achieve—at comparable stability and strength properties of the back rest structure—a lower weight of the back rest structure, a more cost effective production and lower tolerance ranges.

According to the present invention, it is preferred that the thermoplastic composite material is prefabricated in the form of a tape or in the form of a film or in the form of a foil-like structure or sheet.

Furthermore, it is preferred according to the present invention that the back panel element and the seat back frame element are provided of a thermoplastic composite material, wherein the back panel element and the seat back frame element are attached to one another by thermoforming.

The thermoplastic compound material of the thermoplastic composite material according to the present invention preferably comprises Polypropylene and/or Polyethylene terephthalate.

The reinforcement material of the thermoplastic composite material according to the present invention is preferably provided as a glass material, especially glass fibers. According to other embodiments of the present invention, the reinforcement material of the thermoplastic composite material is provided as a volcanic rock based material, especially a fiber material based on a volcanic rock material. Furthermore, according to other embodiments of the present invention, the reinforcement material of the thermoplastic composite material is provided as a carbon fiber material or as a Kevlar fiber material or as a Basalt fiber material. Furthermore, according to the present invention, the reinforcement material of the thermoplastic composite material can also be made from a plurality of the mentioned fiber materials, e.g. the reinforcement material can be provided as a combination of glass fibers and basalt fibers.

According to the present invention, it is furthermore preferred that the fibers of the reinforcement material have a length such as to extend over 20% or more of the largest dimension of the seat back frame element or the back panel element. Preferably, the fibers of the reinforcement material have a length such as to extend over 40% or more of the largest dimension of the seat back frame element or the back panel element, more preferably over 60% or more of the largest dimension of the seat back frame element or the back panel element, and still more preferably over 80% or more of the largest dimension of the seat back frame element or the back panel element.

According to the present invention, it is furthermore preferred that the thermoplastic composite material is prefabricated, e.g. formed as a tape a film or foil-like source material from which the seat back frame element or the back panel element (or both) is formed or are formed by means of a heating step and by means of a subsequent forming step (thermoforming).

Furthermore, according to the present invention, it is preferred to provide both the seat back frame element and the back panel element by the thermoplastic material as a source material. It is hereby to understand that the thermoplastic source materials used for the seat back frame element and for the back panel element, respectively, do not necessarily need to be identical with respect to their thickness and/or with respect to the nature of the reinforcement material used and/or with respect to the thermoplastic compound material used.

However, it is preferred according to the present invention that the back rest structure of the present invention—for the case that both the seat back frame element and the back panel element is made of a thermoplastic material as a source material—does not comprise any additional adhesive material between the preformed source material parts. According to this preferred embodiment, no additional attachment techniques, such as welding or the like are preferably applied to produce the back rest structure according to the present invention. In order for the back rest structure to be assembled, the only steps are: providing the individual preformed elements—such as the seat back frame element and the back panel element, possibly heating the preformed elements and positioning and pressing the preformed elements together (e.g. by means of a thermoforming step) such that a stable connection is formed. This greatly reduces the production cost for providing the back rest structure. The step of positioning and pressing the preformed elements together to form the back rest structure according to the present invention may also comprise an additional forming step. Alternatively, it is also possible according to the present invention that an additional adhesive material between the preformed source material parts is used or that fasteners are used to join the preformed source material parts in order to form the back rest structure. With respect to additional elements like side pivot brackets, belt deflection brackets or the like, adhesives or fasteners are usually used according to the present invention.

BRIEF DESCRIPTION OF THE DRAWINGS

FIGS. 3, 4 and 7 illustrate schematically an exemplary embodiment of a back panel element.

DETAILED DESCRIPTION

Figure 1:
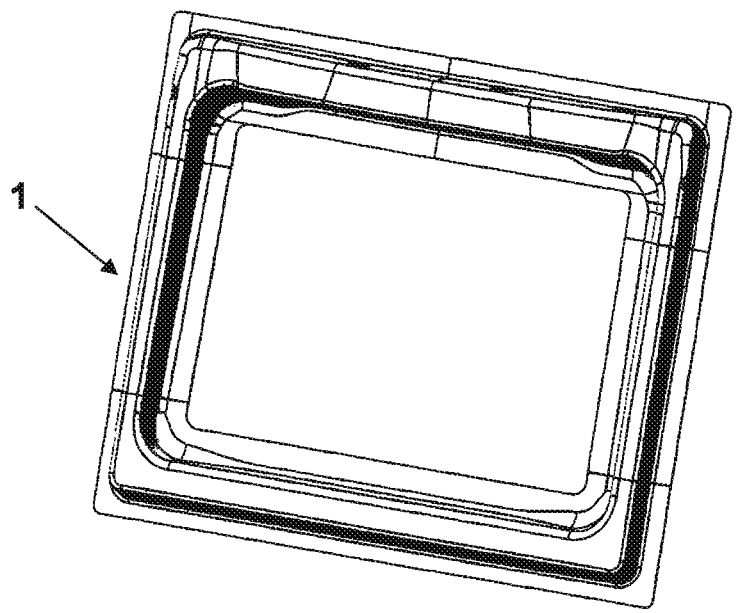
FIGS. 1 and 2 illustrate schematically an exemplary embodiment of a seat back frame element.
Figure 2:
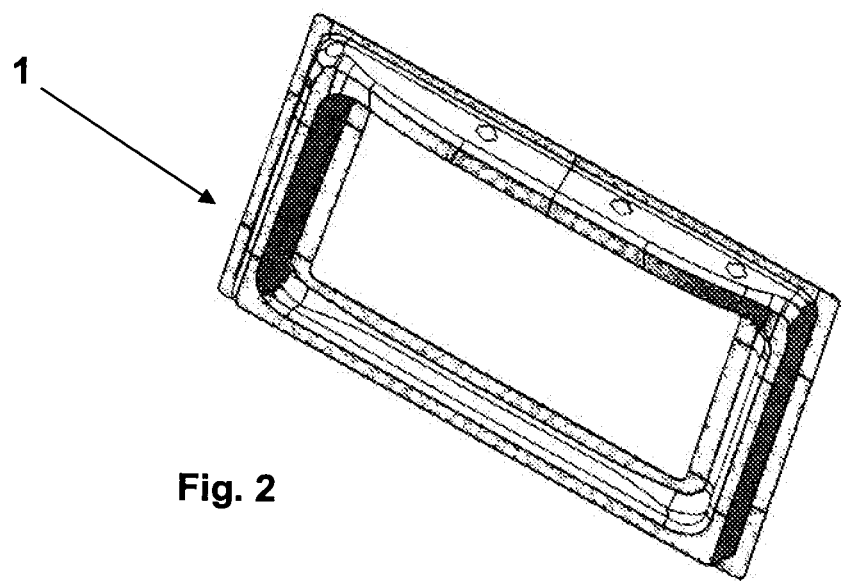
Figure 5:
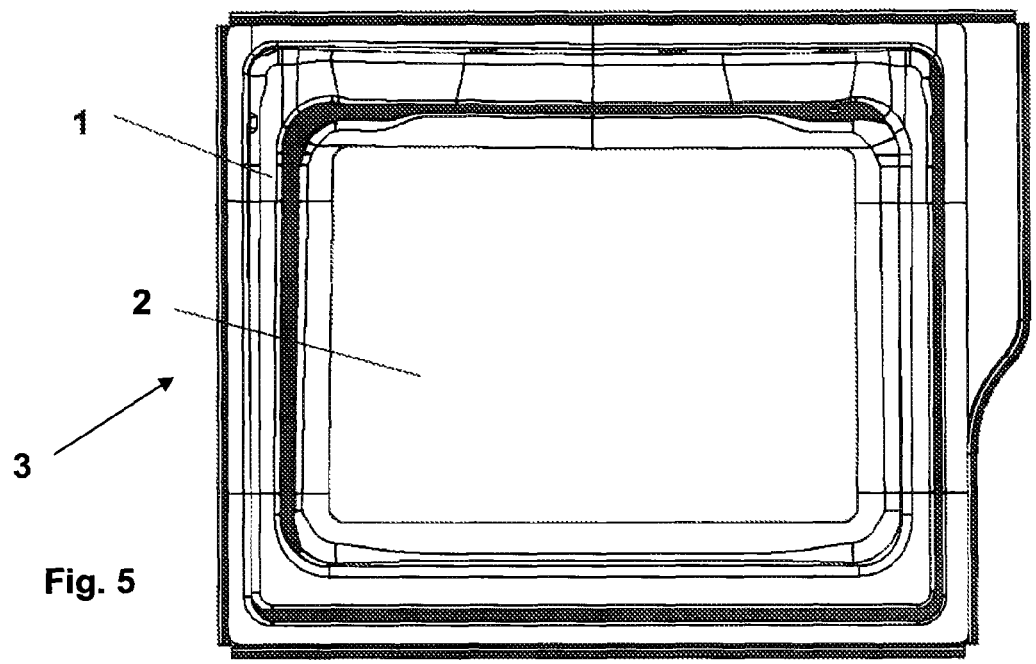
FIG. 5 illustrates schematically an exemplary embodiment of a back rest structure comprising a back panel element and a seat back frame element.
Figure 6:
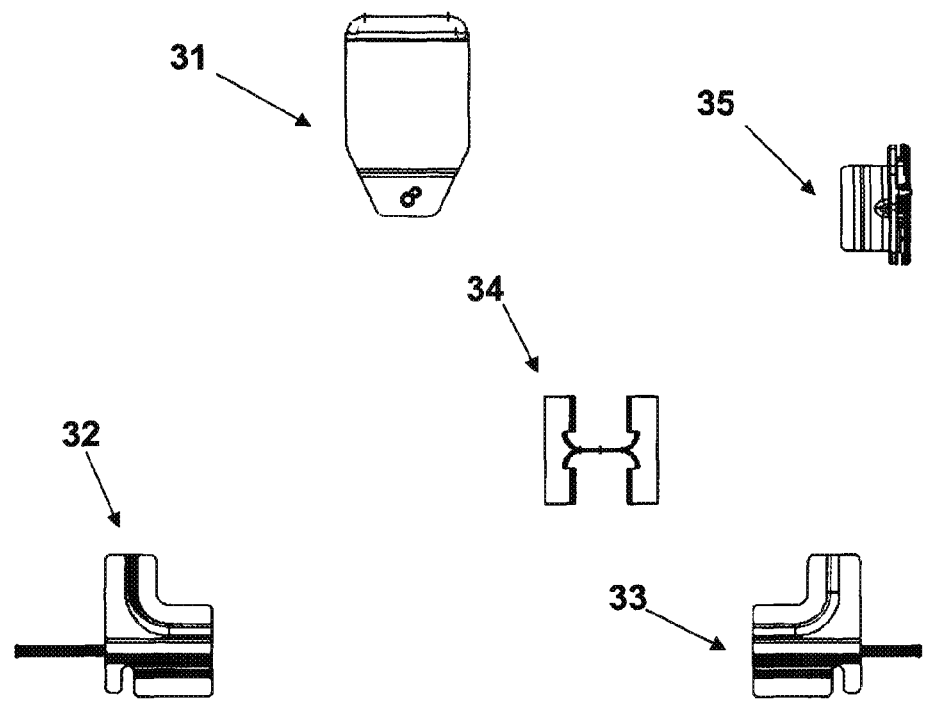
FIG. 6 illustrates schematically additional elements of an exemplary back rest structure.
Figure 7:
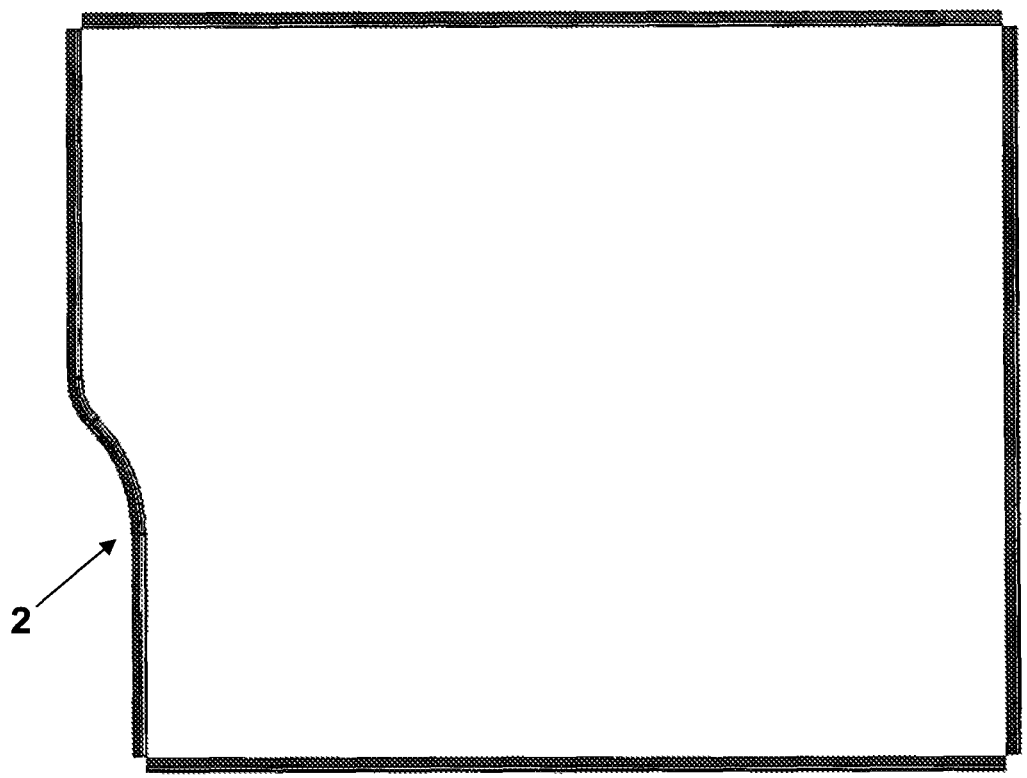

The invention is generally described with respect to FIGS. 1 to 7. A back rest structure 3, especially a back rest structure for a rear seat row of a vehicle is schematically shown in FIG. 5. The seat back rest structure 3 comprises a seat back frame element 1 and a back panel element 2. The seat back frame element 1 and the back panel element 2 are fixedly attached to one another. Exemplary embodiments of a seat back frame element 1 are represented in FIGS. 1 and 2. Exemplary embodiments of a back panel element 2 are represented in FIGS. 3, 4 and 7. The seat back rest structure 3 preferably also comprises further elements or additional elements in order to realize specific functions within the vehicle, such as the back rest being tiltable (e.g. frontwardly to allow for either an enhanced comfort level of a seat occupant or to allow for the possibility to increase the loading capacity of the vehicle), the back rest being lockable to the vehicle body, or the back rest providing additional attachment points, e.g. for child seats or the like. Such additional elements are schematically shown in FIG. 6, namely a left and right hand side pivot bracket 32, 33, a belt deflection bracket 31, a tether bracket 34, and a latch bracket 35. These additional elements are usually attached to the back rest structure by means of an adhesive or by means of fasteners like bolts or the like.

As shown in FIG. 4 (i.e. FIGS. 4a, 4b and 4c), the back panel element 2 can comprise a trim channel element 21 to allow for an easier trim assembly. In FIGS. 4a, 4b, 4c, it is shown how the thermoplastic composite material can be formed into a hook for the trim channel element. As shown in FIGS. 4b and 4c, the thermoplastic composite material can be provided hollow or without any foam (FIG. 4b) or can comprise a foam material 22 (FIG. 4c), especially a low density foam material 22, to separate different layers of the thermoplastic composite material and provide higher stiffness through mechanical advantages of the geometry. The foam 22 or foam material 22 (also called foam core element 22) adds very little mass to the system, the density of the foam core element 22 being e.g. in the range of 0.080 g/cm3 and the density of the thermoplastic composite material with 55 wt-% of glass (and PET as the thermoplastic compound material of the thermoplastic composite material) being, e.g. 1.83 g/cm3.

According to the present invention, the following alternatives of the seat back rest structure 3 are preferred:

the seat back frame element 1 is provided by means of a thermoplastic composite material and the back panel element 2 is provided as a metallic structure;

the seat back frame element 1 is provided as a metallic structure and the back panel element 2 is provided by means of a thermoplastic composite material;

both the seat back frame element 1 and the back panel element 2 are provided by means of a thermoplastic composite material.

Preferably, both the seat back frame element 1 and the back panel element 2 are provided by means of a thermoplastic composite material. Preferably, the thermoplastic composite material is prefabricated (to provide a source material) in the form of a tape or film or foil-like structure or a sheet, then thermoformed (heated and formed) and possibly later on or previously stamped or cut. The seat back frame element 1 and the back panel element 2 are preferably attached to one another also by thermoforming, i.e. heating and pressing the two elements together but alternatively further attachment methods like the use of an adhesive or a mechanical attachment is also possible.

The thermoplastic composite material comprises a thermoplastic compound material and a reinforcement material, wherein with respect to the thermoplastic composite material, the reinforcement material represents 50 wt-% or more than 50 wt-%. Preferably this percentage is even increased to 65 wt-% or 80 wt-%. With an increased content of the reinforcement material (within the thermoplastic composite material), a higher strength and a higher stiffness is possible to achieve according to the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The term "consisting essentially of" (or a derivation thereof) to describe a combination shall include the elements, components or steps identified, and such other elements, components or steps that do not materially affect the basic and novel characteristics of the combination. The use of the terms "comprising" or "including" (or derivations thereof) to describe combinations of elements, components or steps herein also contemplates embodiments that consist essentially of (or even consist of) the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The teachings herein also contemplate methods of using the structures as described, as well as methods that include operational steps performed by the structures herein. Though the use of a single element, component or step is contemplated by the teachings, the disclosure of "a" or "one" to describe an element, component or step is not intended to foreclose additional elements, ingredients, components or steps.

The invention claimed is:

1. A back rest structure for vehicle seats having a back panel element and a seat back frame element, the back panel element and the seat back frame element being fixed to each other, where at least one of the back panel element or the seat back frame element being provided of a thermoplastic composite material, wherein the thermoplastic composite material is prefabricated in the form of a tape, the thermoplastic composite material comprising a thermoplastic compound material and a reinforcement material, wherein with respect to the thermoplastic composite material the reinforcement material represents 50 wt-% or more than 50 wt-%, and
wherein the reinforcement material is glass fibers, a fiber material based on a volcanic rock material, carbon fibers, basalt fibers, or a combination thereof.

2. The back rest structure for vehicle seats according to claim 1, wherein with respect to the thermoplastic composite material the reinforcement material represents 65 wt-% or more than 65 wt-%.

3. The back rest structure for vehicle seats according to claim 1, wherein with respect to the thermoplastic composite material the reinforcement material represents 80 wt-% or more than 80 wt-%.

4. The back rest structure for vehicle seats according to claim 1, wherein the thermoplastic composite material comprises PET as the thermoplastic compound material.

5. The back rest structure for vehicle seats according to claim 1, wherein the thermoplastic composite material is at least partly provided hollow or comprises at least partly a hollow.

6. A method for manufacturing a back rest structure for vehicle seats, the back rest structure having a back panel element and a seat back frame element, the back panel element and the seat back frame element being fixed to each other, where at least one of the back panel element or the seat back frame element being provided of a thermoplastic composite material, wherein the thermoplastic composite material comprises a thermoplastic compound material and a reinforcement material, wherein the reinforcement material is glass fibers, a fiber material based on a volcanic rock material, carbon fibers, basalt fibers, or a combination thereof wherein the method comprises the steps of:
 (i) prefabricating the thermoplastic composite material in the form of a tape,
 (ii) thermoforming the thermoplastic composite material,
 (iii) stamping or cutting the thermoplastic composite material, wherein the step of stamping or cutting the thermoplastic composite material is performed either prior or later to thermoforming the thermoplastic composite material.

7. The method according to claim 6, wherein the back panel element and the seat back frame element are provided of a thermoplastic composite material, wherein the back panel element and the seat back frame element are attached to one another by thermoforming.

8. The method according to claim 6, wherein the step of thermoforming the thermoplastic composite material is conducted by heating the preformed back panel element, the seat back frame element, or both and positioning and pressing the back panel element and the seat back frame element together to create a stable connection so that the back rest structure is formed.

9. The back rest structure for vehicle seats according to claim 1, wherein the seat back frame element is provided as the thermoplastic composite material and the back panel element is provided as a metallic structure.

10. The back rest structure for vehicle seats according to claim 9, wherein the seat back panel element is formed into a hook for a trim channel.

11. The back rest structure for vehicle seats according to claim 1, wherein the seat back frame element is provided as a metallic structure and the back panel element is provided as the thermoplastic composite material.

12. The back rest structure for vehicle seats according to claim 1, wherein both the seat back frame element and the back panel element are provided as the thermoplastic composite material.

13. The back rest structure for vehicle seats according to claim 1, wherein the thermoplastic material is provided without any foam.

* * * * *